(12) United States Patent
Kaminski et al.

(10) Patent No.: US 11,186,514 B2
(45) Date of Patent: Nov. 30, 2021

(54) TEMPERED GLASS SUBSTRATE HAVING REDUCED IRIDESCENCE

(71) Applicant: SAINT-GOBAIN GLASS FRANCE, Courbevoie (FR)

(72) Inventors: Guillaume Kaminski, Linz (AT); François Guiraud, La Croix Saint Ouen (FR); Romain Decourcelle, Margny les Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 165 days.

(21) Appl. No.: 16/334,234

(22) PCT Filed: Sep. 14, 2017

(86) PCT No.: PCT/FR2017/052461
§ 371 (c)(1),
(2) Date: Mar. 18, 2019

(87) PCT Pub. No.: WO2018/051029
PCT Pub. Date: Mar. 22, 2018

(65) Prior Publication Data
US 2020/0017394 A1   Jan. 16, 2020

(30) Foreign Application Priority Data
Sep. 19, 2016  (FR) ...................... 1658748

(51) Int. Cl.
| | | |
|---|---|---|
| *C03B 27/04* | (2006.01) | |
| *C03C 17/32* | (2006.01) | |
| *C03C 17/36* | (2006.01) | |
| *C03B 27/052* | (2006.01) | |
| *C03B 27/044* | (2006.01) | |
| *C03B 27/00* | (2006.01) | |

(52) U.S. Cl.
CPC .......... *C03B 27/0413* (2013.01); *C03B 27/00* (2013.01); *C03B 27/04* (2013.01); *C03B 27/044* (2013.01); *C03B 27/0404* (2013.01); *C03B 27/0417* (2013.01); *C03B 27/052* (2013.01); *C03C 17/32* (2013.01); *C03C 17/366* (2013.01); *C03C 17/3644* (2013.01); *C03C 2218/154* (2013.01); *C03C 2218/328* (2013.01); *C03C 2218/355* (2013.01)

(58) Field of Classification Search
CPC ................................................ C03B 27/0404
See application file for complete search history.

(56) References Cited

U.S. PATENT DOCUMENTS

| | | |
|---|---|---|
| 4,113,458 A | 9/1978 | Cross |
| 6,849,328 B1 | 2/2005 | Medwick et al. |
| 8,166,778 B2 | 5/2012 | Marandon |
| 2006/0201202 A1* | 9/2006 | Nakajima ........... C03C 17/2456 65/60.5 |
| 2008/0302462 A1 | 12/2008 | Sol et al. |
| 2010/0064728 A1 | 3/2010 | Lu |
| 2013/0255319 A1 | 10/2013 | Von Der Ohe et al. |
| 2016/0194516 A1 | 7/2016 | Nadaud et al. |

FOREIGN PATENT DOCUMENTS

| | | |
|---|---|---|
| EP | 0 667 320 A2 | 8/1995 |
| EP | 2 803 646 A1 | 11/2014 |
| WO | WO 2015/019022 A1 | 2/2015 |

OTHER PUBLICATIONS

Von Starck, et al., "Part II—Chapter B—Heating and Heat Treatment," *Handbook of Thermoprocessing Technologies: Fundamentals, Processes, Components, Safety*, Dec. 2005, 269 pages.
International Search Report as issued in International Patent Application No. PCT/FR2017/052461, dated Dec. 13, 2017.

* cited by examiner

*Primary Examiner* — Cynthia Szewczyk
(74) *Attorney, Agent, or Firm* — Pillsbury Winthrop Shaw Pittman LLP

(57) ABSTRACT

A process for the manufacture of a heat strengthened glass substrate, includes the application of a temporary layer including a polymer on a glass substrate including a glass sheet, then the application to the glass substrate coated with the temporary layer of a treatment for the heat strengthening of the glass including heating, leading to the removal of the temporary layer, and then cooling by blowing of air through nozzles. The glass substrate thus obtained exhibits a reduced level of iridescences.

18 Claims, 1 Drawing Sheet a)  b)

a)  b)

TEMPERED GLASS SUBSTRATE HAVING REDUCED IRIDESCENCE

CROSS REFERENCE TO RELATED APPLICATIONS

This application is the U.S. National Stage of PCT/FR2017/052461, filed Sep. 14, 2017, which in turn claims priority to French Patent Application No. 1658748 filed Sep. 19, 2016, the entire contents of all applications are incorporated herein by reference in their entireties.

The invention relates to the field of semi-tempered or tempered heat strengthened glass and provides a solution for reducing the phenomenon of the undesired iridescences which effect this type of glass substrate when the heat strengthening cooling is administered by air-blowing nozzles.

The rapid cooling of a glass substrate brought above its glass transition temperature confers on it specific mechanical properties well known to a person skilled in the art. In particular, the glass exhibits improved mechanical properties and characteristic behavior towards breaking since it fractures spontaneously and completely into a multitude of small, relatively blunt, pieces.

Various tempering processes have been described, such as chemical tempering (see in particular U.S. Pat. No. 8,166,778), heat tempering by contact, according to which the glass is cooled by contact with a cold mold (see in particular EP 667 320), heat tempering in a fluidized bed of solid particles (see U.S. Pat. No. 4,113,458), the "La Bastie" heat tempering, according to which the glass is immersed in fats or oils, or heat tempering by blowing of air (see in particular US 2013255319). For the implementation of this last process, it is possible to use nozzles which blow air directly at the surface of the hot glass, generally over the two main surfaces of the glass substrate. This last process is relatively simple to carry out but the final glass may possibly exhibit more or less strong iridescences according to the angle of viewing, the layers deposited on the glass, the degree of tempering, the equipment used, and the like. These iridescences are colorations which effect the reflected light and probably originate in the structure of the glass, in particular an anisotropic distribution of stresses. They are generally undesired, whether motor vehicle glass or glass for the construction industry is concerned. These iridescences appear to represent a ghost of the network of blowing nozzles used.

WO2015019022 teaches a substrate carrying a functional coating and a temporary protective layer obtained from a liquid composition comprising (meth)acrylate compounds. The tempering of this substrate is envisaged but the cooling technique is not discussed.

There has now been found a process which makes it possible to greatly reduce the iridescences of heat strengthened glass substrates, the cooling of the heat strengthening treatment of which has been carried out by blowing of air by nozzles. The notion of heat strengthening covers those of semitempering and tempering.

According to the invention, a layer comprising a polymer, in particular a polymer of a (meth)acrylate, is applied at the surface of the glass substrate before heating it and then cooling it in order to heat strengthen it. The layer comprising the polymer disappears during the heating of the heat strengthening treatment, in particular by depolymerization and/or oxidation, and this is why it is known as temporary layer. Surprisingly, while the temporary layer disappears during the heating and thus before the blowing of cooling air, the presence of the temporary layer produces a strong decrease in the iridescences observed after cooling. It is believed that the polymer layer improves the homogeneity of the heating of the glass, for this reason reducing the final anisotropy of the glass substrate.

A transparent material having nonuniform residual stresses (this is the case with the tempered or hardened glasses of the prior art) does not transmit light identically at all points of its surface. This is known as birefringence. The latter can be measured by the retardation, which corresponds to the phase shift of a light wave between entering and leaving the transparent material. A high retardation reflects a strong anisotropy. The reduction of the iridescences can thus be evaluated by the measurement of the retardation. These measurements can be carried out by the method described in the paper by M. Illguth, M. Schuler and O. Bucak, 2015, "The effect of optical anisotropies on building glass façades and its measurement method", Frontiers of Architectural Research, 4 pp. 119-126. A measurement per $mm^2$ of glass substrate is carried out and then the arithmetic mean of all these measurements is calculated. The retardations are measured with circular polarized light.

The heat strengthening is applied to the glass substrates by a technique well known to a person skilled in the art involving heating followed by blowing of air through nozzles. It can be a semitempering (generating a surface stress of the glass within the range extending over 40 to 90 MPa, in absolute value) or a tempering (generating a surface stress of the glass of greater than 90 MPa in absolute value). The heat strengthening is applied by rapid cooling and by blowing of air through nozzles over the preheated glass substrate. The heating brings the glass substrate above the glass transition temperature Tg of the glass, as measured by dilatometry. Generally, this heating brings the glass substrate to more than 550° C. and generally to more than 590° C. Generally, the heating is carried out below 720° C. and more generally below 700° C. In the majority of cases, the heating is carried out in the vicinity of 620° C., according to the glass composition and the degree of strengthening desired. The greater the heat strengthening, the higher the surface stress produced. The surface stress can be determined by an apparatus operating on the principle of observing with the polariscope, such as the Scalp-04 polariscope, the value determined being a mean of five measurements on a main surface of the glass substrate and at least 20 cm from the edge. The abovementioned surface stress values are absolute values since a person skilled in the art can also express them with a negative sign.

In the context of the present patent application, "glass substrate" refers to a glass sheet or a glass sheet coated with at least one thin layer, such as a functional coating, in particular of the low-e or solar control type. The term "sheet" covers the notion of plate. "Heat strengthened glass substrate" refers to the glass substrates after application of the process according to the invention, that is to say after application of the heat strengthening (heating then cooling). The glass substrate used at the start of the process according to the invention is not generally heat strengthened. It may be heat strengthened but this is unnecessary since its quality of being heat strengthened disappears from the heating of the strengthening treatment according to the invention.

Thus, the invention relates to a process for the manufacture of a heat strengthened glass substrate, comprising:
  the application of a layer comprising a polymer, in particular a polymer of a (meth)acrylate, a "temporary layer", on a glass substrate comprising a glass sheet, then the application to the glass substrate coated with the temporary layer of a treatment for the heat strengthening of the glass comprising heating, leading to the removal of the temporary layer, and then cooling by blowing of air by nozzles.

Heating is generally carried out at a temperature of greater than 550° C., indeed even of greater than 590° C. It is generally carried out at a temperature of less than 720° C. and more generally of less than 700° C.

Generally, the starting glass substrate comprises a functional coating between the glass and the temporary layer, it being possible for the functional coating to be of the low-e type or of the solar control type. This type of coating can be the cause of difficulty in heating the glass, which strengthens the anisotropic nature of the stresses inside the final glass. It is found that the glass substrates coated with such a functional coating exhibit, after heat strengthening, iridescences which are more marked than in the absence of functional coating. The process according to the invention drastically reduces the iridescences of such heat strengthened glass substrates. Without this explanation being able to place a limitation on the present patent application, it appears that the temporary layer according to the invention helps in a uniform heating of the glass substrate by virtue of its high emissivity. In the event of presence of functional coating, it obstructs the effect of the latter during the heating stage of the heat strengthening treatment, for this reason reducing the anisotropy of the distribution of the stresses and consequently the scale of the iridescences. The temporary layer would thus increase the emissivity of the surface of the glass already coated with the functional layer, the latter having, by nature, a low emissivity. Thus, the glass substrate coated with the temporary layer exhibits a higher emissivity that the same glass substrate devoid of temporary layer. In particular, the glass substrate exhibits, before application of the temporary layer, a normal emissivity of less than 10%, indeed of even less than 5%.

Generally, the functional coating comprises at least one metal layer, in particular comprising silver. The functional coating can comprise a stack of thin layers comprising an alternation of x metal layers and of (x+1) antireflective coatings, each metal layer being positioned between two antireflective coatings. An antireflective coating comprises at least one dielectric layer. Thus, a dielectric layer of the antireflective coating of the functional coating can be in direct contact with the glass. The value of x is greater than or equal to 1 and generally ranges up to 4. A metal layer can be made of silver or based on silver (more than 50% by weight of silver) or be made of a meal alloy containing silver. A dielectric layer within the meaning of the present invention is made of a "nonmetallic" electrical insulating material and is thus not a metal. A dielectric material is made of a material comprising deliberately introduced oxygen and/or nitrogen. This material exhibits an n/k ratio over the entire wavelength range of the visible region (from 380 nm to 780 nm) equal to or greater than 5, n denoting the true retractive index of the material at a given wavelength and k representing the imaginary part of the refractive index at a given wavelength, the ratio n/k being calculated at a given wavelength identical for n and for k.

The dielectric layers of the antireflective coatings can be chosen from oxides, nitrides or oxinitrides of one or more elements chosen from titanium, silicon, aluminum, zirconium, hafnium, tin and zinc.

In particular, the upper layer of the functional coating preferably comprises a nitride or oxide or oxynitride of titanium and/or of zirconium and/or of hafnium, the expression "upper layer" denoting the layer furthest from the glass if the functional coating comprises several layers. In particular, the upper layer can be chosen from a layer from the following list: titanium nitride, zirconium nitride, hafnium nitride, titanium zirconium nitride, titanium zirconium hafnium nitride, titanium oxide, zirconium oxide, hafnium oxide, titanium zirconium oxide and titanium zirconium hafnium oxide.

The functional coating can be deposited by any known means, such as by cathode sputtering assisted by a magnetic field, by thermal evaporation, by CVD or PECVD, by pyrolysis, by deposition by the chemical route or by the sol-gel route or deposition of inorganic layers by the wet route.

All the layers of the functional coating can be deposited by cathode sputtering assisted by a magnetic field. The temporary protective layer is advantageously directly in contact with the functional coating. Generally, the thickness of the functional coating is:

greater than 100 nm, preferably greater than 150 nm,
less than 300 nm, preferably less than 250 nm.

The heat strengthening of the glass involves heating, followed by cooling by blowing of air through nozzles, the blowing being generally carried out simultaneously toward the two main faces of the glass substrate. The cooling can bring about a semitempering or a tempering. Preferably, the heat strengthening is sufficient for the absolute value of the surface stress of the sheet to be greater than 40 MPa, in particular greater than 90 MPa, in particular greater than 110 MPa, in particular greater than 120 MPa (in absolute value). Generally, the absolute value of the surface stress of the sheet is less than 250 MPa.

The temporary layer can be deposited on just one main face or on each of the main faces of the glass substrate. It can be deposited on at least one edge of the glass substrate. The temporary layer is preferably deposited at each place already coated with a functional coating already described above. Thus, the temporary layer is generally directly in contact with the functional coating. Generally, the glass substrate comprises a functional coating on just one of its main faces and the temporary layer is applied on just one of the main faces, that already comprising the functional coating.

The temporary layer is essentially of organic nature. It is produced by application of a liquid composition in a thickness of greater than 1 micrometer on the glass substrate, followed by its solidification by polymerization and/or crosslinking. Generally, the liquid composition has a viscosity of between 0.05 and 5 Pa·s during its application.

The polymer, in particular polymer of a (meth)acrylate, can represent at least 90% of the weight of the temporary layer. The temporary layer can comprise an organic substance distinct from the polymer which can disappear during the heating of the heat strengthening treatment.

A polymer of a (meth)acrylate is formed from the reaction between them of (meth)acrylate compounds present in the liquid composition. The (meth)acrylate compounds are chosen from monomers, oligomers, prepolymers or polymers comprising at least one (meth)acrylate functional group.

(Meth)acrylate is understood to mean an acrylate or a methacrylate. "(Meth)acrylate compounds" are understood to mean the esters of acrylic or methacrylic acid comprising at least one acryloyl ($CH_2$=CH—CO—) or methacryloyl ($CH_2$=CH($CH_3$)—CO—) functional group. These esters can be monomers, oligomers, prepolymers or polymers. These (meth)acrylate compounds, when they are subjected to polymerization conditions, give a polymer network having a solid structure.

The (meth)acrylate compounds used can be chosen from monofunctional and polyfunctional (meth)acrylates, such as mono-, di-, tri- or polyfunctional (meth)acrylates. Examples of such monomers are:

- monofunctional (meth)acrylates, such as methyl(meth) acrylate, ethyl(meth)acrylate, n- or tert-butyl (meth) acrylate, hexyl (meth)acrylate, cyclohexyl (meth) acrylate, 2-ethylhexyl (meth)acrylate, benzyl (meth) acrylate, 2-ethoxyethyl (meth)acrylate, phenyloxyethyl (meth)acrylate, hydroxyethyl acrylate, hydroxypropyl (meth)acrylate, vinyl (meth)acrylate, caprolactone acrylate, isobornyl methacrylate, lauryl methacrylate or polypropylene glycol monomethacrylate,
- difunctional (meth)acrylates, such as 1,4-butanediol di(meth)acrylate, ethylene dimethacrylate, 1,6-hexanediol di(meth)acrylate, bisphenol A di(meth)acrylate, trimethylolpropane diacrylate, triethylene glycol diacrylate, ethylene glycol di(meth)acrylate, polyethylene glycol di(meth)acrylate or tricyclodecane dimethanol diacrylate,
- trifunctional (meth)acrylates, such as trimethylolpropane trimethacrylate, trimethylolpropane triacrylate, pentaerythritol triacrylate, ethoxylated trimethylolpropane triacrylate, trimethylolpropane, trimethacrylate or tripropylene glycol triacrylate,
- (meth)acrylates of higher functionality, such as pentarythritol tetra(meth)acrylate, ditrimethylolpropane tetra (meth)acrylate or dipentaerythritol penta(meth)acrylate or hexa(meth)acrylate.

Preferably, the temporary layer does not comprise an inorganic substance, such as a filler or a pigment. Neither does the temporary layer comprise an additive not capable of being removed during the heating in the context of the heat strengthening, such as, for example, an organic compound comprising silicon of siloxane type. This is because the temporary layer exhibits the property of completely disappearing at the heating temperature in the context of the heat strengthening treatment and it thus must not contain anything which cannot disappear during this heating.

The temporary layer generally exhibits a thickness of greater than 1 micrometer and preferably of greater than 5 micrometers. It generally exhibits a thickness of less than 100 micrometers, preferably of less than 50 micrometers. Its thickness is generally between 2 and 100 micrometers and even between 5 and 50 micrometers, in particular between 10 and 30 micrometers. The temporary layer generally exhibits a weight per unit area of between 5 and 50 g/m², preferably between 10 and 30 g/m². The thicker the temporary layer, the more it increases the emissivity of the glass substrate. It is thus given a sufficient thickness for the emissivity of the glass substrate to be greater than that of the same glass substrate without temporary layer.

For its application, the liquid composition advantageously comprises less than 20% and preferably less than 10% by weight of solvent, with respect to the total weight of the liquid composition, indeed as devoid of solvent. It preferably exhibits a viscosity, measured at 25° C., of at least 0.05 Pa·s, indeed even of at least 0.08 Pa·s, indeed even of at least 0.1 Pa·s, indeed even of at least 0.50 Pa·s. Its viscosity, measured at 25° C., is generally of at most 5 Pa·s, indeed even of at most 2 Pa·s.

The liquid composition generally comprises at least one polymerization initiator, preferably a photoinitiator, said initiator generally representing from 0.1% to 20%, indeed even from 1% to 15%, preferably from 5% to 15% and better still from 8% to 12% of the total weight of the (meth) acrylate compounds. The nature of the initiator depends on the type of curing chosen. For example, in the event of thermal curing, the initiators of benzoyl peroxide type are used. In the event of curing by UV radiation, initiators known as photoinitiators are used. The liquid composition can additionally comprise at least one additive chosen from plasticizers, absorbers, separating agents, heat stabilizers and/or light stabilizers, thickening agents or surface modifiers, the sum of all the additives generally being between 0% and 5% of the weight of the liquid composition. The polymerization initiators are not regarded as additives.

Preferably, the (meth)acrylate compounds are chosen from esters of acrylic or methacrylic acid comprising at least two acryloyl ($CH_2$=CH—CO—) or methacryloyl ($CH_2$=$CH(CH_3)$—CO—) functional groups. Preferably, the liquid composition comprises, by weight with respect to the total weight of the (meth)acrylate compounds, by increasing order of preference, at least 50%, at least 60%, at least 70%, at least 80%, at least 90%, 100% of (meth) acrylate compounds chosen from esters of acrylic or methacrylic acid, having at least two acryloyl ($CH_2$=CH—CO—) or methacryloyl ($CH_2$=$CH(CH_3)$—CO—) functional groups.

Preferably, the liquid composition comprises, by weight with respect to the total weight of the (meth)acrylate compounds:

- from 30% to 80% by weight of at least one aliphatic urethane-acrylic oligomer,
- from 20% to 70% by weight of at least one (meth)acrylate monomer chosen from a mono-, bi- or trifunctional (meth) acrylate.

The liquid composition can comprise:
- at least one aliphatic urethane-acrylic oligomer,
- at least one (meth)acrylate monomer chosen from mono-, bi- or trifunctional (meth)acrylate monomers,
- at least one polymerization initiator.

The liquid composition can comprise:
- at least one aliphatic urethane-acrylic oligomer,
- at least one difunctional (meth)acrylate monomer,
- at least one trifunctional (meth)acrylate monomer,
- at least one polymerization initiator, preferably a photoinitiator.

The liquid composition can be applied at ambient temperature by any known means and in particular by roll-to-roll coating, by spraying, by dipping, by curtain coating or by gun spraying. The liquid composition is preferably applied by roll-to-roll coating. The rate of deposition of the liquid composition can be between 1 and 90 m/mm.

The temporary layer can be cured:
- by drying at a temperature of less than 200° C. for a period of time ranging, for example, from 10 s to 180 s,
- by UV crosslinking (various wavelengths), preferably in the open air and at ambient temperature, or
- by an electron beam.

The starting glass substrate, as well as the final glass substrate (heat strengthened), can have a thickness within the range extending from 1 to 20 mm and more particularly within the range extending from 2 to 10 mm.

The temporary layer can be deposited on the glass substrate before or after a cutting stage, that is to say, in the latter case, on a glass substrate at the final size or close to the final size of the heat strengthened glass substrate.

In addition to its beneficial effect in reducing the anisotropy of the heat strengthened glass substrate, the polymer layer protects an optional functional coating from oxidation and mechanical stresses which may occur during its conveying.

The invention also relates to a line for the manufacture of heat strengthened glass substrates from glass substrates comprising a glass sheet, comprising, in the following order:
- a device for application to the glass substrates of a temporary layer comprising a polymer,
- a device for heating the glass substrates coated with the temporary layer,
- a device for blowing of air by nozzles over the heated glass substrates,
- means for conveying the glass substrates from the first to the final device of the line.

In the case where the temporary layer comprises a polymer of a (meth)acrylate, the device for deposition of a temporary layer comprises:
- a device for deposition of a layer of a liquid composition comprising (meth)acrylate compounds on the glass substrates,
- a device for solidification, by polymerization and/or crosslinking, of the (meth)acrylate compounds, leading to the temporary layer on the glass substrates.

Generally, the means for conveying the glass substrates comprise a bed of rollers on which the glass substrates progress forward one behind the other. This roller bed passes through the heating oven and the device for blowing of air by nozzles. Nozzles blow air through the roller bed toward the downward facing face of the glass substrates and toward the upward facing face of the glass substrates. The device for blowing of air by nozzles comprises nozzles positioned above and below the roller bed in order to blow air toward the two main faces of the glass substrates.

The manufacturing line can comprise a device for deposition of a functional coating before the device for the deposition of a layer of a liquid composition. It can be a device for cathode sputtering assisted by a magnetic field.

In particular, the device for the deposition of a liquid composition can comprise a roll-to-roll coating device. In particular, the crosslinking device can comprise a UV lamp. In particular, the manufacturing line can comprise a device for cutting up the glass substrates between the crosslinking device and the heating device.

The invention leads to glass substrates which can display iridescences in reduced fashion. The invention makes it possible in particular to prepare a heat strengthened glass sheet comprising a surface stress of greater than 40 MPa, indeed even of greater than 90 MPa, and comprising iridescences visible to the naked eye, the arithmetic mean of the retardation of which, measured with circular polarized light, is less than 50 nm. In particular, this sheet can comprise, on one of its main faces, a functional coating, in particular for solar control, comprising at least one metal layer, said coating having a thickness of between 100 and 300 nm. In particular, the heat strengthened glass sheet can have a high proportion of its surface exhibiting a retardation of less than 50 nm. This proportion can be greater than 60%, indeed even greater than 70%.

EXAMPLES 1 AND 2

Two glass sheets with a thickness of 6 mm and with dimensions of 800 mm×600 mm, of Saint Gobain Glass CoolLite 154 II trademark, are taken. These two sheets exhibited, on one of their main faces, a functional coating of the solar control type made of a stack of thin layers successively comprising, from the glass, an alternation of two silver layers and of three antireflective coatings, each antireflective coating comprising several dielectric layers, including one made of $Si_3N_4$ and one made of ZnO, so that each silver layer is positioned between two antireflective coatings. The total thickness of this functional coating is between 150 and 200 nm.

On one of the sheets, a temporary layer is applied directly on the functional coating in the following way:

A liquid composition was prepared with mixtures of oligomers and of monomers, having at least one acrylate functional group sold by Sartomer:
- CN9276: tetrafunctional aliphatic urethane-acrylate oligomer,
- SR351: trimethylolpropane triacrylate, trifunctional acrylate monomer,
- SR833S: tricyclodecanedimethanol diacrylate, difunctional acrylate monomer.

The presence of the urethane-acrylate oligomer makes it possible to adjust the hardness and flexibility properties of the temporary protective layer. The temporary protective layer is subsequently cured by crosslinking with UV radiation. Irgacure 500, sold by BASF, as polymerization initiator, is added to the liquid composition. The acrylates and the initiator were present in the liquid composition in the following proportions, given as parts by weight:

TABLE 1

| Acrylate oligomer CN9276 | 60 |
| Trifunctional acrylate SR351 | 20 |
| Difunctional acrylate SR833S | 20 |
| Initiator Irgacure 500 | 5 |

The liquid composition had a viscosity at 25° C. of 1.08 Pa·s and was applied on the glass substrate by roll-to-roll coating. A thickness of between 10 and 20 μm is obtained using speeds for the applicator roll of between 15 and 25 m/min. The temporary layer is cured by UV radiation provided by a mercury lamp with a power of 120 W. Under these conditions, the polymerization of the mixture of monomers and of oligomers is obtained within the thickness range from 10 to 20 μm.

The emissivity of the glass substrate without a polymer layer (example 1, comparative) was 2.52%. The emissivity of the glass substrate with the polymer layer (example 2, according to the invention) was 56.9%. The emissivity is the normal emissivity (in the perpendicular direction) measured by the standard EN12898 of January 2001.

Heat strengthening of these two sheets is carried out by applying heating at 600° C. to them, followed by rapid cooling by blowing of air by nozzles which blow over the two main faces of the two sheets. The surface compression is subsequently measured at 60 MPa.

Figure 1:
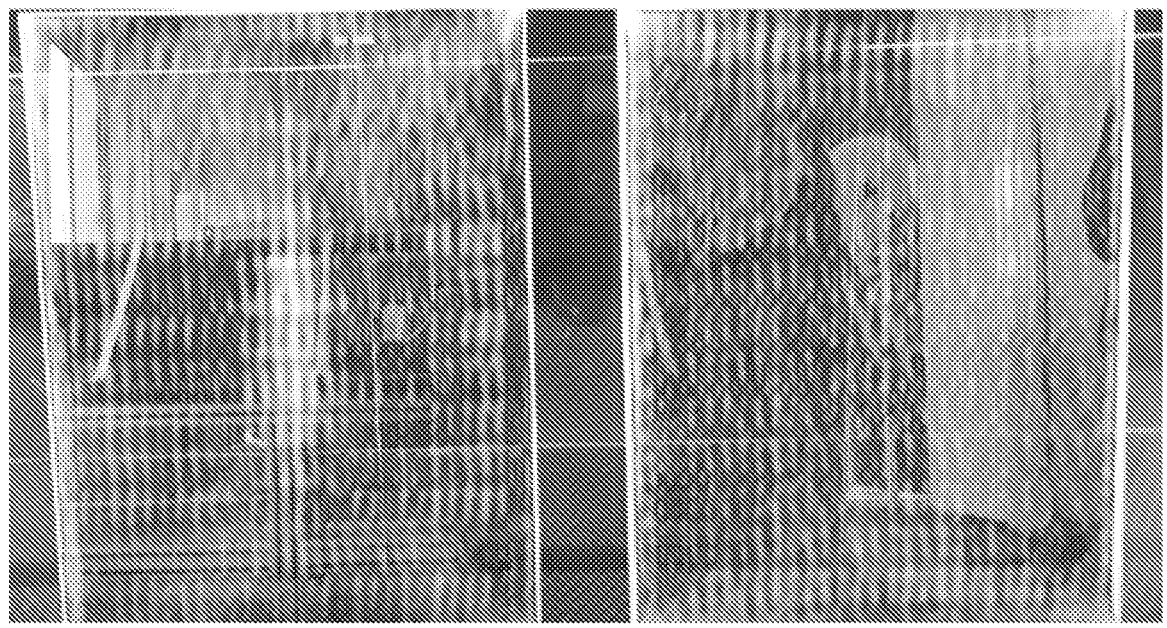
FIGS. 1a and 1b show two substrates observed with a circular polariscope and corresponding to, respectively, examples 1 and 2.

These substrates are subsequently observed with a circular polariscope (the substrates are placed between two polarizing filters). FIG. 1 shows these two substrates. In a), the substrate which had not received the temporary layer (example 1) exhibits a strong white mark in the central region.

The arithmetic mean of the retardations of these two sheets was measured by the method described in the paper by M. Illguth, M. Schuler and O. Bucak, 2015, "The effect of optical anisotropies on building glass façades and its measurement method", Frontiers of Architectural Research, 4 pp. 119-126. A measurement per $mm^2$ was carried out and then the arithmetic mean was calculated. The retardations were measured with circular polarized light. The results are collated in Table 2.

TABLE 2

|  | Mean retardants | % of surface area with retardation <50 nm |
|---|---|---|
| Ex 1 (without polymer layer) | 56.6 | 50% |
| Ex 2 (with polymer layer) | 33.2 | 80% |

EXAMPLES 3 AND 4

Figure 2:
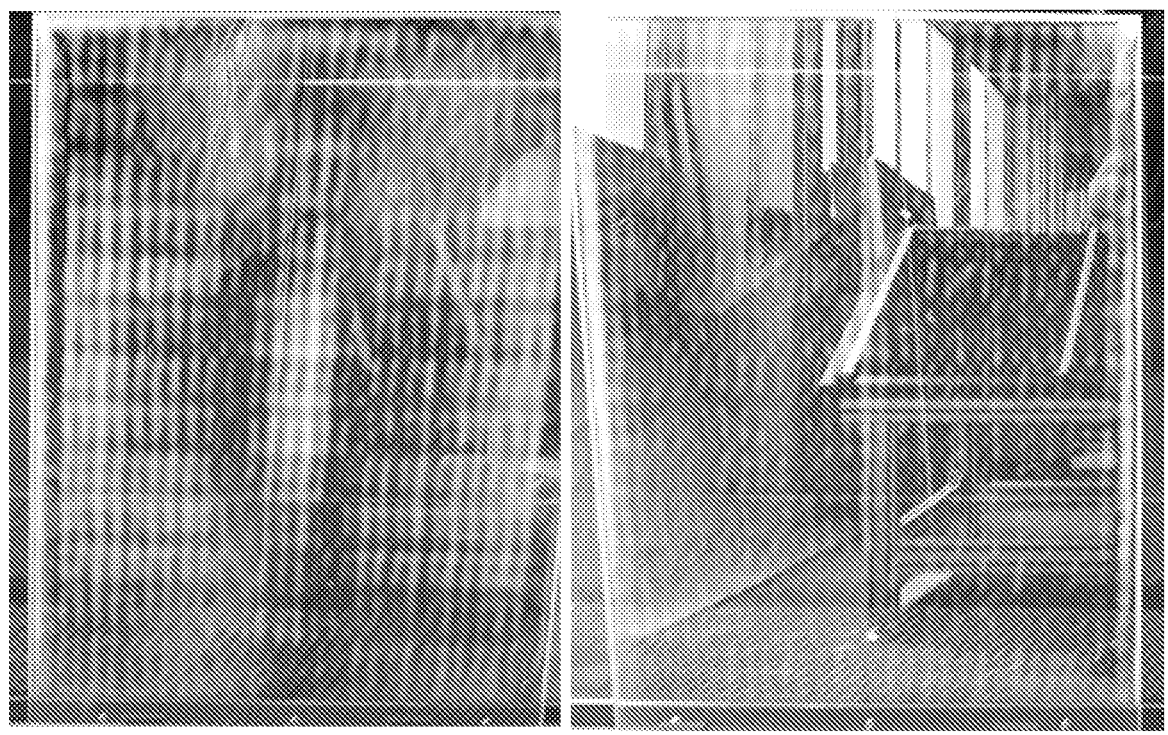
FIGS. 2a and 2b show two substrates observed with a circular polariscope and corresponding to, respectively, examples 3 and 4.

The procedure as for Examples 1 and 2 is used, except that the heat strengthening is more intense because of faster cooling and leads to a surface compression of 110 MPa and that the observation is simply carried out in reflection with the naked eye. FIG. 2 shows these two substrates. In a), the substrate had not received the temporary layer and, in b), the substrate had received the temporary layer. The substrate which had not received the temporary layer shows much more marked iridescences.

The invention claimed is:

1. A process for the manufacture of a heat strengthened glass substrate, comprising:
applying a temporary layer comprising a polymer on a glass substrate comprising a glass sheet, then
applying to the glass substrate coated with the temporary layer a treatment for the heat strengthening of the glass comprising heating, leading to a removal of the temporary layer, and then, after said heating and removing the temporary layer, cooling the glass substrate by blowing of air through nozzles,
wherein a thickness of the temporary layer is selected such that a normal emissivity of the substrate coated with the temporary layer is greater than a normal emissivity of the substrate before application of the temporary layer and over 60% of a surface of the glass substrate initially covered by the temporary layer exhibits a mean retardation of less than 50 nm after the glass substrate is cooled.

2. The process as claimed in claim 1, wherein the heating is carried out at a temperature of greater than 550° C.

3. The process as claimed in claim 1, wherein the glass substrate exhibits, before application of the temporary layer, a normal emissivity of less than 10%.

4. The process as claimed in claim 1, wherein the temporary layer has a thickness of between 1 and 100 micrometers.

5. The process as claimed in claim 1, wherein the glass substrate comprises a functional coating, the temporary layer being applied on the functional coating.

6. The process as claimed in claim 5, wherein the functional coating is of the low-e type or of the solar control type.

7. The process as claimed in claim 5, wherein the functional coating is deposited by cathode sputtering assisted by a magnetic field and wherein the temporary layer is directly in contact with the functional coating.

8. The process as claimed in claim 5, wherein the functional coating comprises an upper layer chosen from nitrides, oxides or oxinitrides of titanium and/or of zirconium and/or of hafnium.

9. The process as claimed in claim 1, wherein the functional coating comprises at least one metal layer.

10. The process as claimed in claim 9, wherein the functional coating comprises a stack of thin layers comprising an alternation of x metal layers based on silver or on a metal alloy containing silver and of (x+1) antireflective coatings, each antireflective coating comprising at least one dielectric layer, each metal layer being positioned between two antireflective coatings, x being greater than or equal to 1.

11. The process as claimed in claim 1, wherein the cooling produces a surface stress of the glass of greater than 40 MPa.

12. The process as claimed in claim 11, wherein the cooling is a heat tempering producing a surface stress of greater than 90 MPa.

13. The process as claimed in claim 1, wherein the polymer is a polymer of a (meth)acrylate.

14. The process as claimed in claim 13, further comprising:
preparing a liquid composition comprising (meth)acrylate compounds chosen from monomers, oligomers, prepolymers or polymers comprising at least one (meth)acrylate functional group,
applying the liquid composition on the glass substrate, then
solidifying, by polymerization and/or crosslinking, the composition, so as to form the temporary layer.

15. The process as claimed in claim 14, wherein the liquid composition comprises less than 20% by weight of solvent and has a viscosity of between 0.05 and 5 Pa·s at its application.

16. The process as claimed in claim 1, further comprising cutting up the glass substrate between the application of the temporary layer and the heating.

17. The process as claimed in claim 1, wherein over 70% of the surface of the glass substrate initially covered by the temporary layer exhibits a mean retardation of less than 50 nm after the glass substrate is cooled.

18. The process as claimed in claim 17, wherein at least over 80% of a surface of the glass substrate initially covered by the temporary layer exhibits a mean retardation of less than 50 nm after the glass substrate is cooled.

* * * * *